United States Patent
Ikeda et al.

(10) Patent No.: US 10,509,714 B2
(45) Date of Patent: Dec. 17, 2019

(54) INFORMATION PROCESSING APPARATUS AND INFORMATION PROCESSING SYSTEM

(71) Applicant: Mitsubishi Electric Corporation, Chiyoda-ku (JP)

(72) Inventors: Norio Ikeda, Tokyo (JP); Mitsuo Shimotani, Tokyo (JP); Shinji Ota, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 238 days.

(21) Appl. No.: 15/549,532

(22) PCT Filed: Mar. 9, 2015

(86) PCT No.: PCT/JP2015/056803
§ 371 (c)(1),
(2) Date: Aug. 8, 2017

(87) PCT Pub. No.: WO2016/143026
PCT Pub. Date: Sep. 15, 2016

(65) Prior Publication Data
US 2018/0024906 A1  Jan. 25, 2018

(51) Int. Cl.
*G06F 11/34* (2006.01)
*G06F 9/54* (2006.01)

(52) U.S. Cl.
CPC ............ *G06F 11/3466* (2013.01); *G06F 9/54* (2013.01)

(58) Field of Classification Search
CPC ...... G06F 11/30; G06F 11/34; G06F 11/3466; G06F 9/54

(Continued)

(56) References Cited

U.S. PATENT DOCUMENTS

| 5,745,760 A | 4/1998 | Kawamura et al. |
| 6,381,628 B1 * | 4/2002 | Hunt ...................... G06F 9/465 709/201 |

(Continued)

FOREIGN PATENT DOCUMENTS

| JP | 4-223547 A | 8/1992 |
| JP | 5-61732 A | 3/1993 |

(Continued)

OTHER PUBLICATIONS

International Search Report dated Jun. 2, 2015 in PCT/JP2015/056803 filed Mar. 9, 2015.

*Primary Examiner* — Marina Lee
(74) *Attorney, Agent, or Firm* — Oblon, McClelland, Maier & Neustadt, L.L.P.

(57) ABSTRACT

An object of the present invention is to provide an information processing apparatus capable of performing a performance evaluation easily without using a specific communication protocol. An information processing apparatus according to the present invention includes: a plurality of application executing units; and a plurality of communication library executing units, and the communication library executing unit includes: a communication monitoring unit monitoring a data communication of one of the application executing units and the other application executing units and generating a communication information including API types used in one of the application executing units at time of the data communication for all of the data communication which is monitored; a communication information storage storing the communication information; and a communication information analyzing unit estimating a pair of API types used in one of the application executing units at time of the data communication based on the communication information.

16 Claims, 12 Drawing Sheets

(58) Field of Classification Search
USPC .................................................. 717/124–135
See application file for complete search history.

(56) References Cited

U.S. PATENT DOCUMENTS

| | | | | |
|---|---|---|---|---|
| 7,788,370 | B2* | 8/2010 | Yugami | G06F 11/3447 709/223 |
| 7,827,185 | B2* | 11/2010 | Goodman | G06F 9/451 707/748 |
| 8,615,589 | B1* | 12/2013 | Adogla | G06F 9/5077 709/226 |
| 8,667,156 | B2* | 3/2014 | Soliman | H04L 41/12 709/229 |
| 9,003,432 | B1* | 4/2015 | Pellowski | G06F 13/102 719/321 |
| 9,218,225 | B2* | 12/2015 | Musteata | G06F 9/54 |
| 2002/0165838 | A1* | 11/2002 | Vetter | G06F 11/3404 706/20 |
| 2005/0018611 | A1* | 1/2005 | Chan | H04L 41/147 370/241 |
| 2007/0260589 | A1* | 11/2007 | Yugami | G06F 11/3447 |
| 2016/0057207 | A1* | 2/2016 | Li | H04N 21/4431 709/203 |
| 2016/0380860 | A1* | 12/2016 | Singhal | H04L 43/0864 709/224 |
| 2018/0024906 | A1* | 1/2018 | Ikeda | G06F 9/54 717/127 |

FOREIGN PATENT DOCUMENTS

| | | |
|---|---|---|
| JP | 7-129439 A | 5/1995 |
| JP | 2007-304647 A | 11/2007 |
| JP | 2012-222692 A | 11/2012 |
| JP | 2013-171542 A | 9/2013 |

* cited by examiner

| API TYPE | #1 |
|---|---|
| DESTINATION APPLICATION TYPE | APPLICATION B |
| SOURCE APPLICATION TYPE | APPLICATION A |
| INPUT TIME | 1970-01-01T00:00:00.0 |

FIG. 14

| API TYPE | #1 |
|---|---|
| COMMUNICATION MEANS TYPE | #1 |
| DESTINATION APPLICATION TYPE | APPLICATION B |
| SOURCE APPLICATION TYPE | APPLICATION A |
| INPUT TIME | 1970-01-01T00:00:00.0 |

INFORMATION PROCESSING APPARATUS AND INFORMATION PROCESSING SYSTEM

TECHNICAL FIELD

The present invention relates to an information processing apparatus and information processing system in which a plurality of applications operate in cooperation with each other via communication.

BACKGROUND ART

Conventionally, there is an information processing apparatus which mounts a microcomputer, a processor, or the like. The information processing apparatus mounts an application to execute a specific function, and the application is generally mounted on the information processing apparatus for each function. In some cases, a plurality of applications (application group) in a single information processing apparatus operate in coordination via communication, using a communication library which mediates a data communication between the applications, to provide a more complex function to a user. Furthermore, there is also an information processing apparatus having a configuration that a plurality of information processing apparatuses are mutually connected via a communication means such as a serial communication cable, a local area network, or Internet, for example, to perform a communication between each information processing apparatus, thereby allowing a mutual provision of the application operating in each information processing apparatus (the applications operate in cooperation with each other).

The case where the plurality of applications operate in cooperation with each other in the single information processing apparatus and the case where the plurality of applications operate in cooperation with each other among the plurality of information processing apparatuses, described above, are the same as each other in terms of operating the plurality of applications in cooperation with each other via communication. A system that the plurality of applications operating in at least one information processing apparatus operate in cooperation with each other using the communication library or the communication means is referred to as an information processing distribution system.

An example of a performance of the information processing distribution system includes a processing speed. The processing speed is used as a barometer, for example, for confirming whether or not a processing speed defined in a specification of the information processing distribution system is satisfied, or for selecting an information processing apparatus or application having a high processing speed so that the user obtains a favorable usability, in some cases.

Conventionally disclosed is a technique relating to a method of evaluating a processing speed and a selection of an information processing apparatus based on the evaluation (for example, refer to Patent Document 1). The Patent Document 1 discloses a technique in which an information processing apparatus is provided with a monitoring unit for measuring a state of a calculating resource such as a Central Processing Unit (CPU) or a memory, for example, the monitoring unit measures a processing speed, and the information processing apparatus which performs a communication is selected based on the processing speed measured by the monitoring unit.

In the meanwhile, with regard to a method of evaluating a processing speed, a technique of using a Round Trip (RT) time as a barometer is disclosed (for example, refer to Patent Document 2). The RT time indicates a time required for an application to call a function of the other application in such a manner as calling an appropriate API, for example, and then receive the function of the other application which has been called by calling an API for reception, for example. It is necessary for an accurate evaluation of the RT time to cause a communication at a time of the transmission to correspond with a communication at a time of receiving a response to the transmission. The Patent Document 2 discloses a technique of determining a communication to be monitored using a header information of a TCP packet in an information processing distribution system which applies a PCT/IP as a communication protocol between the applications to evaluate the RT time.

PRIOR ART DOCUMENTS

Patent Documents

Patent Document 1: Japanese Patent Application Laid-Open No. 4-223547
Patent Document 2: Japanese Patent Application Laid-Open No. 2012-222692

SUMMARY

Problem to be Solved by the Invention

The techniques of the Patent Documents 1 and 2 have two problems described below in applying to a general information processing distribution system.

Firstly, in the general information processing distribution system, each information processing apparatus constituting the information processing distribution system does not necessarily include a function unit for monitoring the calculation resource. Accordingly, there are a limited number of information processing distribution systems which enable an application of the technique of the Patent Document 1. When the technique of the Patent Document 1 is applied to the information processing distribution system which does not include the function unit for monitoring the calculation resource, a conversion of a hardware or a rewriting of a software, which requires time and effort, is necessary in the information processing apparatus.

Secondly, there are various types of communication means and communication libraries used in the general information processing distribution system. Accordingly, there are a limited number of information processing distribution systems which enable an application of the technique of the Patent Document 2 with a view to a usage of the TCP/IP.

The present invention has been achieved to solve the above-described problem, and it is an object of the present invention to provide an information processing apparatus and information processing system capable of performing a performance evaluation easily without using a specific communication protocol.

Means to Solve the Problem

In order to solve the above problem, an information processing apparatus according to the present invention includes: a plurality of application executing units executing an application for achieving a preset function; and a plurality of communication library executing units provided to correspond to each of the application executing units to manage a data communication between each of the application executing units, wherein the communication library executing unit includes: a communication monitoring unit monitoring the data communication of one of the application executing units provided to correspond to the communication library executing unit and the other application executing units and generating a communication information including API types each indicating a type of an API used in one of the application executing units at time of the data communication for all of the data communication which is monitored; a communication information storage storing the communication information generated in the communication monitoring unit; and a communication information analyzing unit estimating a pair of API types used in one of the application executing units at time of the data communication based on the communication information stored in the communication information storage.

Effects of the Invention

According to the present invention, an information processing apparatus includes: a plurality of application executing units executing an application for achieving a preset function; and a plurality of communication library executing units provided to correspond to each of the application executing units to manage a data communication between each of the application executing units, wherein the communication library executing unit includes: a communication monitoring unit monitoring the data communication of one of the application executing units provided to correspond to the communication library executing unit and the other application executing units and generating a communication information including API types each indicating a type of an API used in one of the application executing units at time of the data communication for all of the data communication which is monitored; a communication information storage storing the communication information generated in the communication monitoring unit; and a communication information analyzing unit estimating a pair of API types used in one of the application executing units at time of the data communication based on the communication information stored in the communication information storage. Thus, the performance evaluation can be easily performed without using the specific communication protocol.

These and other objects, features, aspects and advantages of the present invention will become more apparent from the following detailed description of the present invention when taken in conjunction with the accompanying drawings.

BRIEF DESCRIPTION OF DRAWINGS

FIG. 14 A diagram illustrating an example of an item included in a communication information generated in a communication monitoring unit according to the embodiment 5 of the present invention.

DESCRIPTION OF EMBODIMENT(S)

Embodiments of the present invention are described hereinafter based on the drawings.

Embodiment 1

Described firstly is a configuration of an information processing apparatus according to the embodiment 1 of the present invention.

Figure 1:
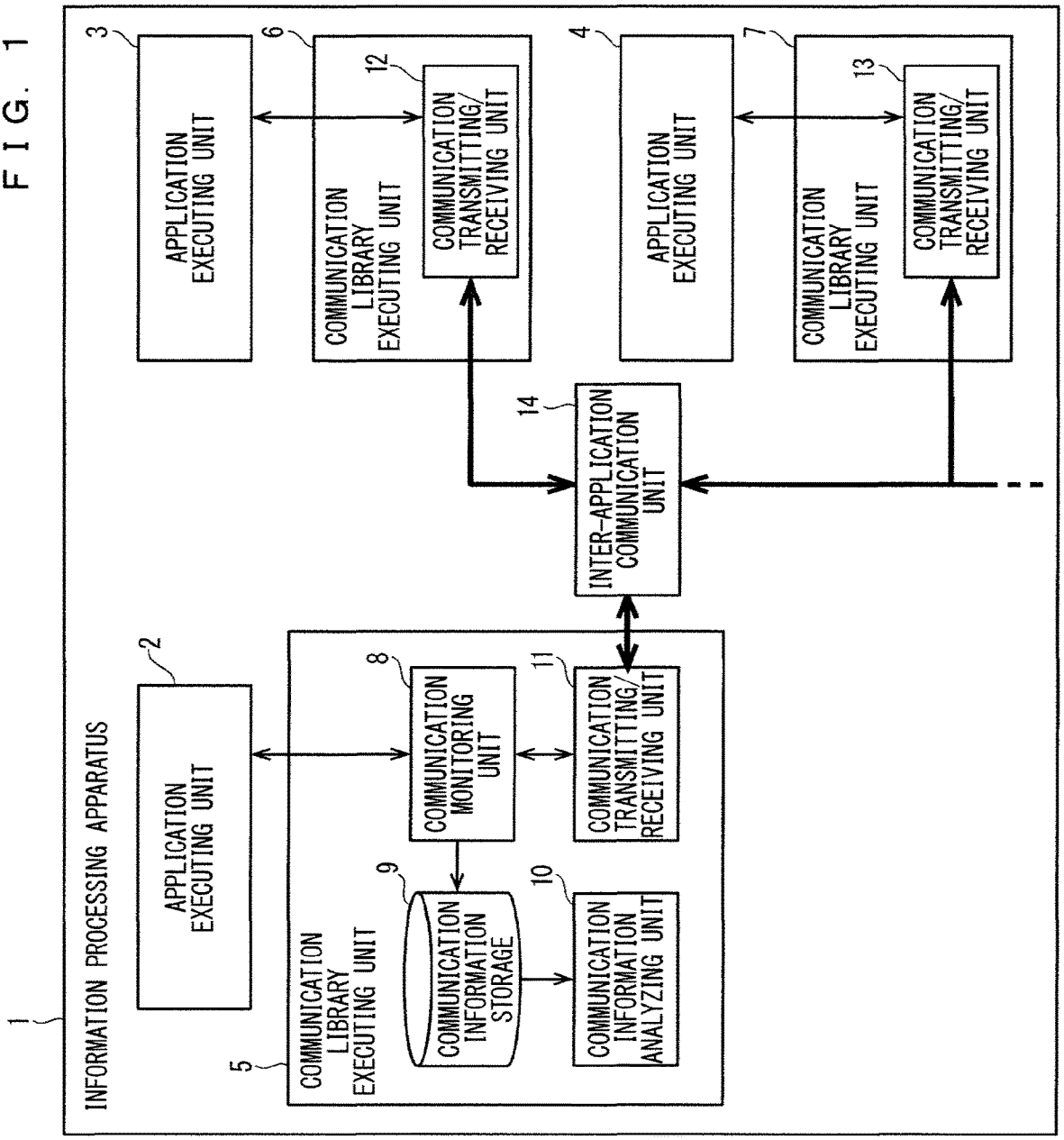
FIG. 1 A block diagram illustrating an example of a configuration of an information processing apparatus according to an embodiment 1 of the present invention.

FIG. 1 is a block diagram illustrating an example of the configuration of an information processing apparatus 1 according to the embodiment 1. The embodiment 1 describes a case of achieving an information processing distribution system in the single information processing apparatus 1.

As illustrated in FIG. 1, the information processing apparatus 1 according to the embodiment 1 includes application executing units 2, 3, and 4, communication library executing units 5, 6, and 7, and an inter-application communication unit 14.

The application executing unit 2 is a software and a hardware for executing an operation of an application using a function such as an operating system or a monitor program operating in the information processing apparatus 1. Herein, the application indicates a software for achieving a specific function executed by the application executing unit 2. The application executing unit 2 executes an application A hereinafter.

The application executing units 3 and 4 have a function similar to that of the application executing unit 2. The application executing unit 3 executes an application B, and the application executing unit 4 executes an application C hereinafter.

The communication library executing unit 5 is provided to correspond to the application executing unit 2 and manages a data communication between the application executing unit 2 and the application executing units 3 and 4. The communication library executing unit 5 includes a communication monitoring unit 8, a communication information storage 9, a communication information analyzing unit 10, and a communication transmitting/receiving unit 11. The communication monitoring unit 8, the communication information storage 9, and the communication information analyzing unit 10 have a function of performing a performance evaluation of the application executing unit 2.

The communication monitoring unit 8 monitors the data communication between the application executing unit 2 and the other application executing units 3 and 4, and generates a communication information for all of the monitored data communications. Specifically, when data relating to the data communication transmitted from the application executing unit 2 is input or data relating to the data communication transmitted from the other application executing units 3 and 4 is input via the communication transmitting/receiving unit 11, the communication monitoring unit 8 generates the communication information for the data communication.

Figures 2, 3:
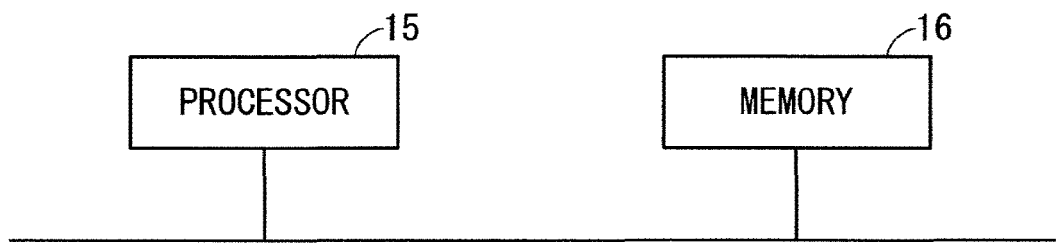
FIG. 2 A diagram illustrating an example of a communication information generated in a communication monitoring unit according to the embodiment 1 of the present invention.
FIG. 3 A diagram illustrating an example of a hardware configuration corresponding to a software function in the information processing apparatus according to the embodiment 1 of the present invention.

FIG. 2 is a diagram illustrating an example of the communication information generated in the communication monitoring unit 8.

As illustrated in FIG. 2, the communication information includes an API type indicating a type of an API used in the application executing unit 2 in the data communication, a destination application type indicating a type of an application executed by the application executing unit (one of the application executing units 2, 3, and 4) which is to be a destination of the data communication, a source application type indicating a type of an application executed by the application executing unit (one of the application executing units 2, 3, and 4) which is to be a source of the data communication, and an input time indicating a time when the data relating to the data communication has been input to the communication monitoring unit 8.

A name or an ID number ("#1" in an example in FIG. 2) uniquely indicating the API type is generated as the API type. Generated as the destination application type is a name or an ID number ("application B" executed by the application executing unit 3, in the example in FIG. 2) uniquely indicating the application executed by the application executing unit which is to be the destination. Generated as the source application type is a name or an ID number ("application A" executed by the application executing unit 2, in the example in FIG. 2) uniquely indicating the application executed by the application executing unit which is to be the source. As the input time, the time when the data relating to the data communication is input to the communication monitoring unit 8 ("1970-01-01T00:00:00.0" in the example in FIG. 2) is generated.

Going back to FIG. 1, the communication information storage 9 stores the communication information generated in the communication monitoring unit 8.

The communication information analyzing unit 10 estimates a pair of API types used in the application executing unit 2 in the data communication based on the communication information stored in the communication information storage 9. The communication information analyzing unit 10 can individually select and obtain the API type, the destination application type, or the source application type at a time of obtaining the communication information from the communication information storage 9.

The communication transmitting/receiving unit 11 transmits the data relating to the data communication being input from the application executing unit 2 via the communication monitoring unit 8 to the application executing unit 2 or the application executing unit 3. The communication transmitting/receiving unit 11 receives the data relating to the data communication transmitted from the application executing unit 2 or the application executing unit 3.

The communication library executing unit 6 is provided to correspond to the application executing unit 3 and manages the data communication between the application executing unit 3 and the application executing units 2 and 4. The communication library executing unit 6 includes a communication transmitting/receiving unit 12.

The communication transmitting/receiving unit 12 transmits the data relating to the data communication being input from the application executing unit 3 to the application executing unit 2 or the application executing unit 4. The communication transmitting/receiving unit 12 receives the data relating to the data communication transmitted from the application executing unit 2 or the application executing unit 4.

The communication library executing unit 7 is provided to correspond to the application executing unit 4 and manages the data communication between the application executing unit 4 and the application executing units 2 and 3. The communication library executing unit 7 includes a communication transmitting/receiving unit 13.

The communication transmitting/receiving unit 13 transmits the data relating to the data communication being input from the application executing unit 4 to the application executing unit 2 or the application executing unit 3. The communication transmitting/receiving unit 13 receives the data relating to the data communication transmitted from the application executing unit 2 or the application executing unit 3.

The inter-application communication unit 14 mediates the data communication between each of the application executing units 2, 3, and 4. The inter-application communication unit 14 is achieved by using a shared memory or a socket, for example.

FIG. 3 is a diagram illustrating an example of a hardware configuration corresponding to a software function in the information processing apparatus 1.

In the information processing apparatus 1 illustrated in FIG. 1, the application executing units 2, 3, and 4, the communication library executing units 5, 6, and 7, the communication monitoring unit 8, the communication information storage 9, the communication information analyzing unit 10, the communication transmitting/receiving units 11, 12, and 13, and the inter-application communication unit 14 are achieved as functions of a processor 15 illustrated in FIG. 3 when the processor 15 executes a program stored in a memory 16, for example. However, these may be achieved by a plurality of processors 15 in cooperation with each other, for example.

Next, an operation of the information processing apparatus 1 is described.

Figure 4:
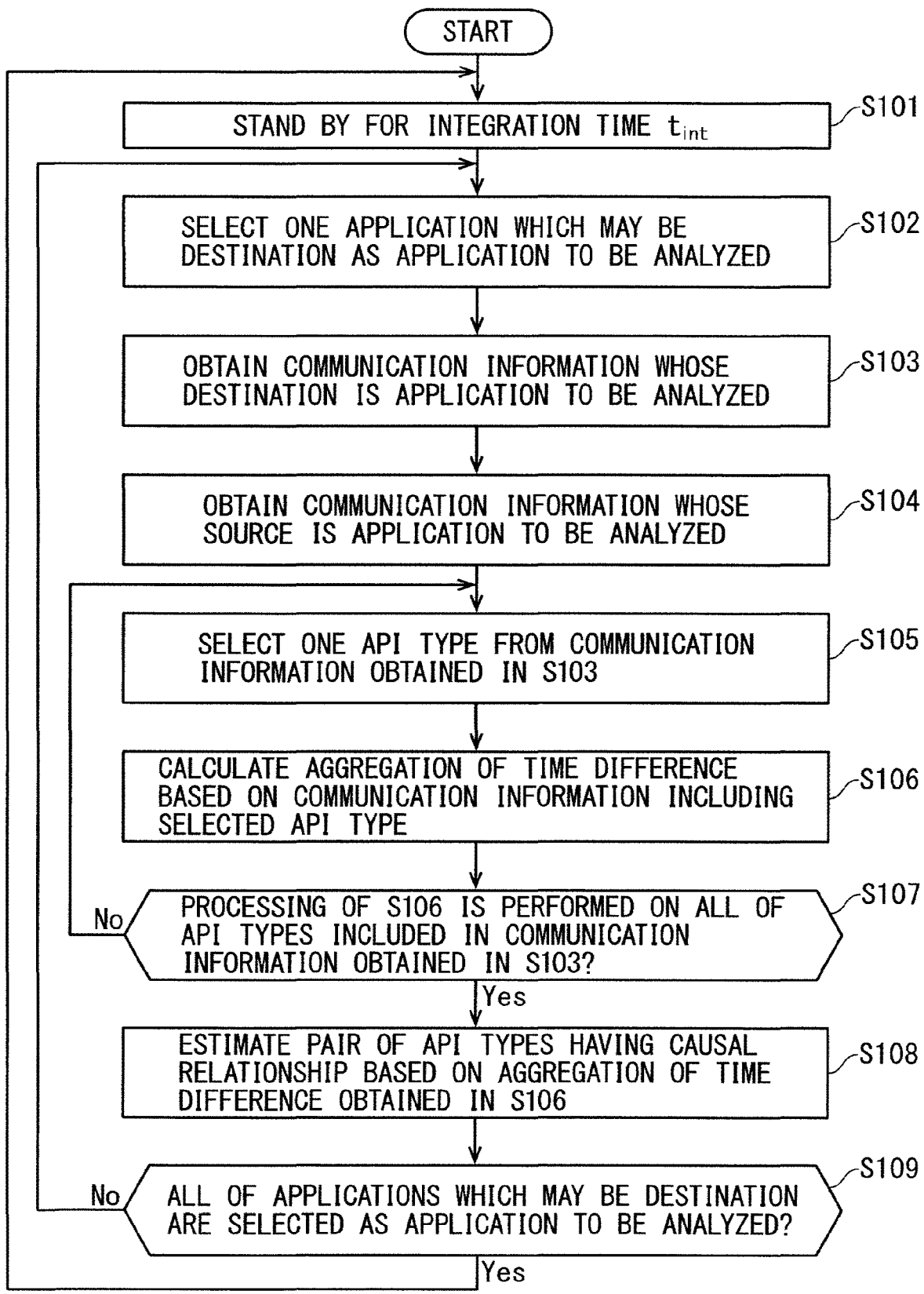
FIG. 4 A flow chart showing an example of an operation of a communication information analyzing unit according to the embodiment 1 of the present invention.

FIG. 4 is a flow chart showing an example of an operation of the communication information analyzing unit 10.

In Step S101, the communication information analyzing unit 10 stands by for an integration time $t_{int}$ until a total number of communication information required for the analysis is accumulated in the communication information storage 9. Herein, the integration time $t_{int}$ is a parameter which can be changed in accordance with a content of the performance evaluation of the application executing unit 2. When the integration time $t_{int}$ is reduced, for example, a time resolution can be enhanced, so that the performance of the application executing unit 2 can be evaluated at short time intervals. However, since the number of communication information used for analysis is small, a statistical uncertainty increases. In contrast, when the integration time $t_{int}$ is increased, a performance evaluation result, which is statistically superior, can be easily obtained. However, it is difficult to perform the evaluation following a time fluctuation of the application executing unit 2. As described above, a user which performs the performance evaluation can perform a desired performance evaluation by changing a value of the integration time $t_{int}$.

In Step S102, the communication information analyzing unit 10 selects one application which may be the destination as an application to be analyzed. In the example in FIG. 1, the application B (the application executing unit 3) or the application C (the application executing unit 4) which may be the destination is selected.

A processing of Step S102 is necessary for an accurate estimation of the pair of API types performed in a subsequent processing. For example, there is a case where APIs having the same name and signature are included in the different applications. When such different applications are processed at a time by an analysis method described hereinafter, the APIs, which clearly have no causal relationship with each other, may be analyzed together by reason that they have the same name. In the embodiment 1, the application to be analyzed is selected (specified) to solve such a problem.

In Step S103, the communication information analyzing unit 10 obtains the communication information, whose destination is the application to be analyzed which is selected in Step S102, from the communication information storage 9. The communication information transmitted to the application to be analyzed is obtained in the processing of Step S103.

In Step S104, the communication information analyzing unit 10 obtains the communication information, whose source is the application to be analyzed which is selected in Step S102, from the communication information storage 9. The communication information received from the application to be analyzed is obtained in the processing of Step S104.

In Step S105, the communication information analyzing unit 10 selects one API type from the communication information obtained in Step S103.

In Step S106, the communication information analyzing unit 10 calculates an aggregation of a time difference based on the communication information including the API type selected in Step S105.

Figure 5:
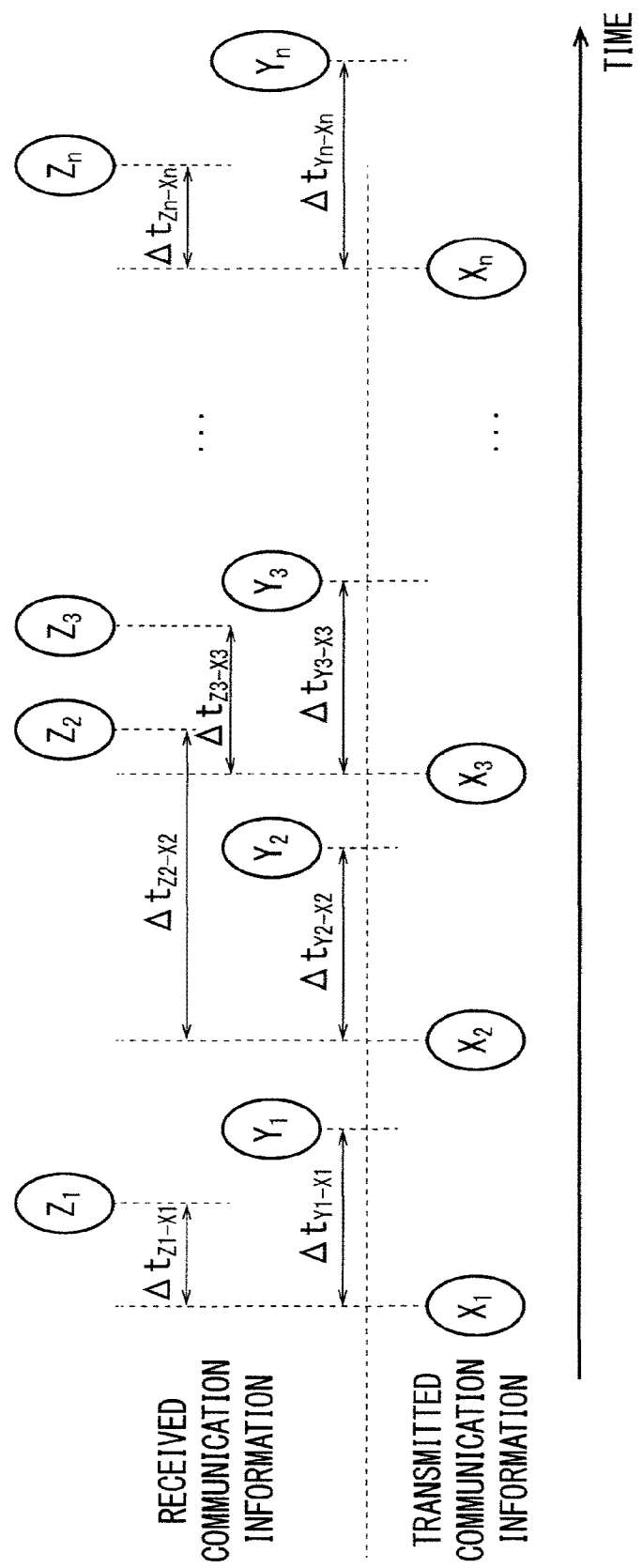
FIG. 5 A diagram for explaining a calculation of an aggregation of a time difference according to the embodiment 1 of the present invention.

FIG. 5 is a diagram for explaining the calculation of the aggregation of the time difference.

In FIG. 5, the communication information including the API type selected in Step S105 is indicated by X. The communication information obtained in Step S103 includes n pieces of communication information X, and each of the n pieces of communication information X is distinguished as $X_1, X_2, X_3, \ldots,$ and $X_n$.

In FIG. 5, in order to simplify the description, there are two types of API included in the communication information obtained in Step S104. The two API types are referred to as communication information Y and Z, respectively. The communication information obtained in Step S104 includes n pieces of communication information Y and Z. Each of the n pieces of communication information Y is distinguished as $Y_1, Y_2, Y_3, \ldots,$ and $Y_n$, and each of the n pieces of communication information Z is distinguished as $Z_1, Z_2, Z_3, \ldots,$ and $Z_n$. The communication information obtained in Step S104 generally includes two or more types of API, and a method of calculating a time difference distribution described hereinafter holds true when there are an optional number of API types.

Firstly, a time difference between input times of the communication information $X_1$ and the communication information $Y_1$ to $Y_n$ and a time difference between input times of the communication information $X_1$ and the communication information $Z_1$ to $Z_n$ are calculated. At this time, a value of the time difference, which is positive and the shortest, in the calculated time differences is defined as a representative value. In the example in FIG. 5, the n time differences between the communication $X_1$ and $Y_1$ to $Y_n$ are calculated, in these n time differences, a time difference $\Delta t_{Y1-X1}$ between the communication information $X_1$ and the communication information $Y_1$ is the representative value. The representative value is calculated in an order of the communication information having the earlier time (the ascending subscript number of the communication information X, Y, and Z in FIG. 5).

The communication information which has been already used for calculating the representative value is not used when the time difference is calculated. For example, in the communication information Z, the communication information $Z_2$ has the smallest time difference with the communication information $X_3$, however, the communication information $Z_2$ is used for calculating the representative value of the time difference with the communication information $X_2$, so that the communication information $Z_2$ cannot be used for calculating the representative value of the time difference with the communication information $X_3$. In the above case, the communication information $Z_3$ having the smallest time difference with the communication information $X_3$ next to the communication information $Z_2$ is used for calculating the representative value of the time difference with the communication information $X_3$.

The above processing is sequentially performed on the communication information $X_1$ to $X_n$, and the aggregation of the time differences of the communication information Y and Z with respect to the communication information X including the API type selected in Step S105 is thereby calculated.

The method of calculating the aggregation of the time difference calculated in Step S106 is not limited to the method described above. For example, a calculation method adopting a frequency analysis algorism such as Fourier transform or wavelet transform to the aggregation of the input time may also be applicable.

Going back to FIG. 4, in Step S107, the communication information analyzing unit 10 determines whether or not the processing in Step S106 is performed on all of the API types included in the communication information obtained in Step S103. When the processing in Step S106 has been performed on all of the API types included in the communication information obtained in Step S103, the processing proceeds to Step S108. In the meanwhile, when the processing in Step S106 has not been performed on all of the API types included in the communication information obtained in Step S103, the processing proceeds to Step S105.

In Step S108, the communication information analyzing unit 10 estimates the pair of API types having the causal relationship based on the aggregation of the time difference obtained in Step S106.

Firstly, the communication information analyzing unit 10 generates a frequency distribution of the time difference for the aggregation of all the time differences. In the example in FIG. 5, the frequency distribution of the time difference of the pair of communication information X and communication information Y and the pair of communication information X and communication information Z is generated.

Figure 6:
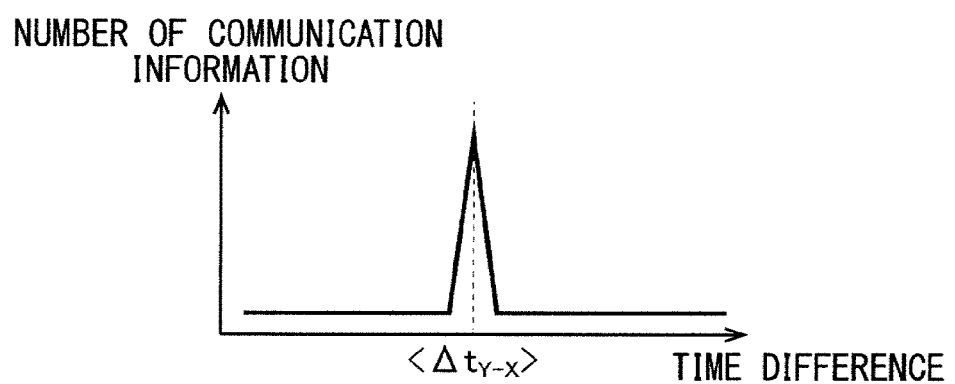
FIG. 6 A diagram illustrating an example of a frequency distribution of the time difference according to the embodiment 1 of the present invention.
Figure 7:
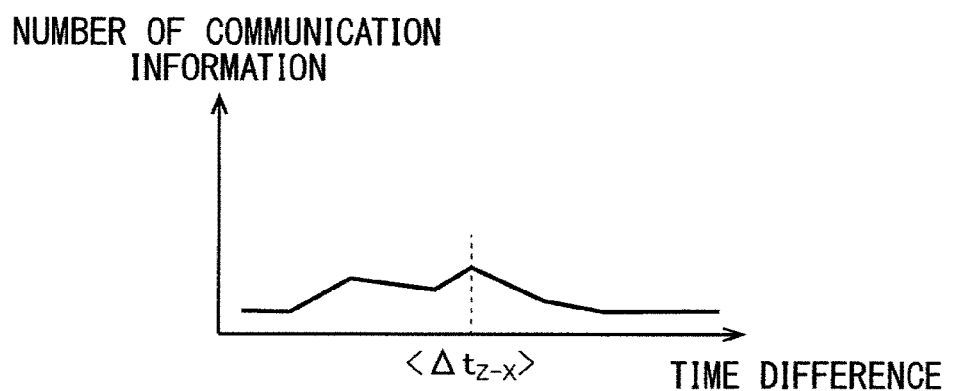
FIG. 7 A diagram illustrating an example of a frequency distribution of the time difference according to the embodiment 1 of the present invention.

FIGS. 6 and 7 are diagrams showing an example of the frequency distribution of the time difference in the example in FIG. 5.

In the example in FIG. 5, the communication information Y forms the periodic distribution of the time difference with respect to the communication information X. Accordingly, the frequency distribution of the time difference in the pair of communication information X and communication information Y has a high peak of a most frequent value $<\Delta t_{Y-X}>$ as a center with little diffusion, as shown in FIG. 6.

In the meanwhile, in the example in FIG. 5, the communication information Z forms the non-periodic distribution of the time difference with respect to the communication information X. Accordingly, the frequency distribution of the time difference in the pair of communication information X and communication information Z has a low peak of a most frequent value $<\Delta t_{Y-Z}>$ with a wide diffusion, as shown in FIG. 7.

The communication information analyzing unit 10 detects the peak in the frequency distribution of the obtained time difference, using the above characteristics, and estimates a pair of API types from which a significant peak is obtained to be the pair of API types having the causal relationship. In the example in FIG. 5, the pair of API types included in the communication information X and API type included in the communication information Y are estimated to be the pair of API types having the causal relationship.

The detection of the peak can be easily obtained by using a known technique such as a sigma clipping method, a function fitting method, a differential filter method. For example, when the function fitting method is used, an amount relating to the diffusion of peak width (that is to say, the time difference diffusion) can be obtained, so that the peak can be obtained using the time difference diffusion to determine the significance of the peak.

Finally, the communication information analyzing unit 10 obtains a peak point (the most frequent value $<\Delta t_{Y-X}>$ in FIG. 6) from the frequency distribution of the time difference in each communication information (the communication information X and Y in the example in FIG. 5) estimated to be the pair of API types having the causal relationship, and estimates the time difference at the peak position to be the RT time. For example, when the application B is selected as the application to be analyzed in Step S102 in FIG. 4, the RT time between the application executing unit 2 executing the application A and the application executing unit 3 executing the application B is estimated.

Going back to FIG. 4, in Step S109, the communication information analyzing unit 10 determines whether or not all of the applications which may be the destination are selected as the applications to be analyzed. When all of the applications which may be the destination are selected as the applications to be analyzed, the processing proceeds to Step S101. In the meanwhile, when all of the applications which may be the destination are not selected as the applications to be analyzed, the processing proceeds to Step S102.

As described above, according to the embodiment 1, there is no need to rewrite the application at the time of introducing the function of performing the performance evaluation into the information processing distribution system, but the communication library executing unit only needs to be changed. Moreover, since the pair of API types which have transmitted and received the data are estimated based on the communication information including the API type, the source application type, the destination application type, and the input time, the pair of API types can be estimated just by monitoring the communication, without recognizing the relationship between the APIs which are pieces of information inherent in the applications in advance, in the information processing distribution system adopting the optional communication protocol. Accordingly, an independence of the function between the application and the function of performing the performance evaluation (the communication monitoring unit 8, the communication information storage 9, and the communication information analyzing unit 10) can be ensured. That is to say, the performance evaluation can be easily performed without using the specific communication protocol.

The information processing apparatus 1 may have a function of directly using the estimation result of the pair of API types. For example, there is a case where the application A executed in the application executing unit 2 is an in-house product and the application B executed in the application executing unit 3 is others' product. The others' application provides, in some cases, only a binary executable file instead of a source code with a view to preventing a technique included in the application from being revealed, for example. In such a case, it is necessary to investigate what type of response (reply) is returned when what type of data is transmitted to externally determine the behavior of the others' application. In order to meet the needs, the information processing apparatus 1 may constitute an application investigation tool which enables an automatic investigation by using the estimation result of the pair of API types calculated in the communication information analyzing unit 10.

FIG. 1 illustrates a case where the communication library executing unit 5 includes the communication monitoring unit 8, the communication information storage 9, and the communication information analyzing unit 10, however, the configuration is not limited thereto. For example, when the performance evaluation also needs to be performed on at least one of the application executing units 3 and 4, it is also applicable to include the communication monitoring unit 8, the communication information storage 9, and the communication information analyzing unit 10 in the at least one of the application executing units 3 and 4 on which the performance evaluation needs to be performed.

Although the information processing apparatus 1 illustrated in FIG. 1 includes the three application executing units (the application executing units 2, 3, and 4), the information processing apparatus 1 may include a plurality of application executing units.

Embodiment 2

In the embodiment 1, the communication information analyzing unit 10 estimates the pair of API types having the causal relationship and the RT time by analyzing all of the pieces of communication information stored (accumulated) in the communication information storage 9. However, when the information processing distribution system is made up of a large number of application groups, or when the information processing distribution system includes a large number of pairs of API types, the number of pairs of API types and RT times estimated in the communication information analyzing unit 10 enormously increases. Accordingly, this makes the performance evaluation of detecting an abnormal behavior of the RT time, for example, difficult.

Moreover, in the embodiment 1, the communication information analyzing unit 10 processes the large amount of communication information, so that an enormously large calculation load is imposed on the communication information analyzing unit 10, and may have an influence on the whole communication information distribution system function. Furthermore, when the information processing apparatus is an apparatus such as an embedded device which does not secure a sufficient memory region, it is hard to secure the region for storing the large amount of communication information, so that communication information which is not subject to the performance evaluation may occur.

In order to solve such a problem, the embodiment 2 of the present invention has a feature of selecting (limiting) at least one of the application to be analyzed and API type to estimate the RT time based on the selected the application to be analyzed or API type. An information processing distribution system according to the embodiment 2 is described in detail hereinafter.

Figure 8:
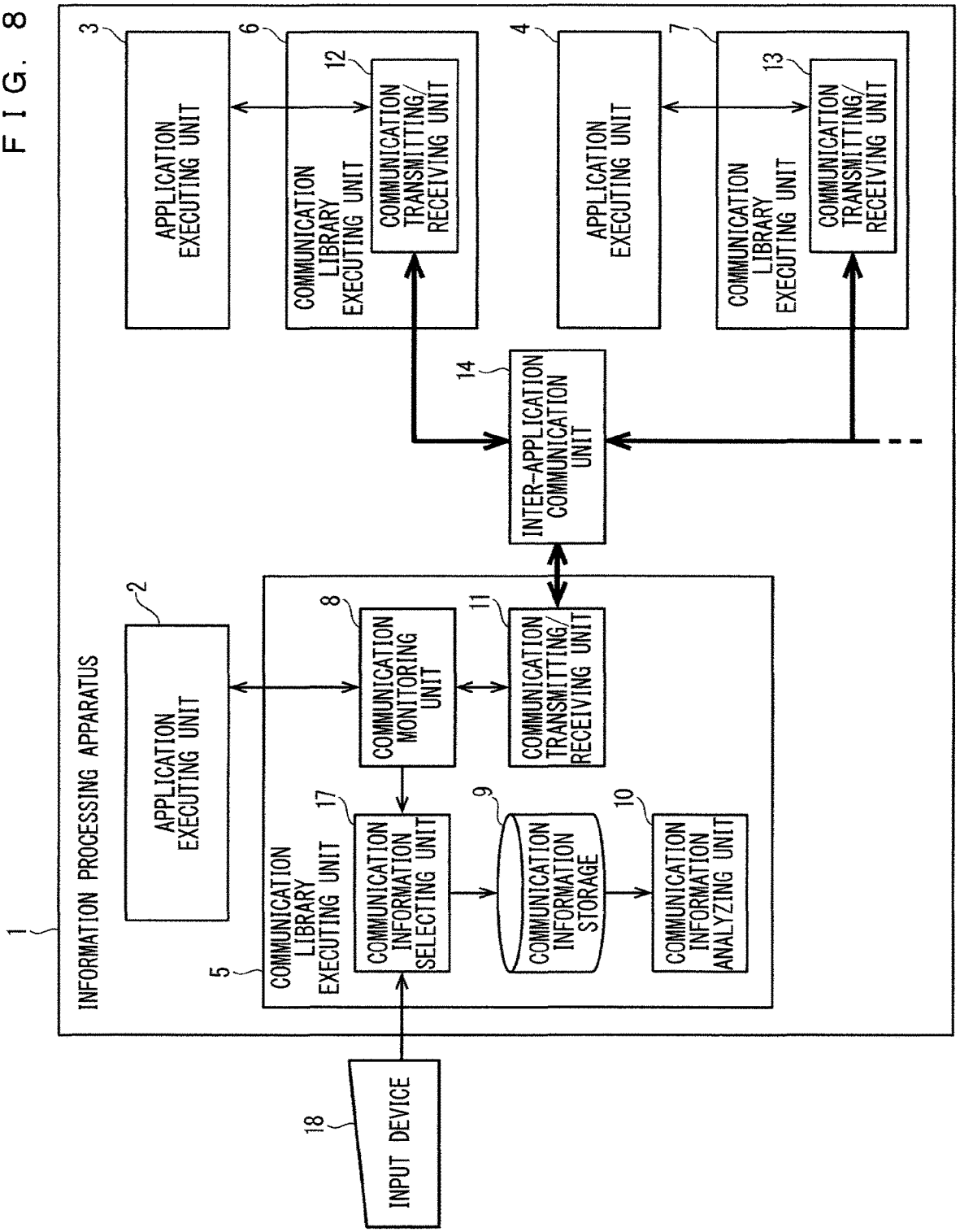
FIG. 8 A block diagram illustrating an example of a configuration of an information processing apparatus according to an embodiment 2 of the present invention.

FIG. 8 is a block diagram illustrating an example of a configuration of the information processing apparatus 1 according to the embodiment 2. The embodiment 2 describes a case of achieving the information processing distribution system in the single information processing apparatus 1.

As illustrated in FIG. 8, the information processing apparatus 1 according to the embodiment 2 has a feature of including a communication information selecting unit 17. The communication information selecting unit 17 is connected to an input device 18. The other configuration and operation are similar to that of the embodiment 1, so that the detailed description is omitted here.

The input device 18 receives the input of the API type, the destination application type, the source application type performed by the user. Herein, the input device 18 may be an input equipment such as a keyboard or a touch panel, for example, which can be operated by the user. The input device 18 may be a device which reads out the API type, the destination application type, and the source application type which are preset in the setting file, for example, from outside and then inputs them to the communication information selecting unit 17.

The communication information generated in the communication monitoring unit 8 is input to the communication information selecting unit 17. The communication information selecting unit 17 compares the API type, the destination application type, and the source application type included in the communication information being input from the communication monitoring unit 8 with the API type, the destination application type, and the source application type being input from the input device 18. When at least one of the application to be analyzed and API type coincides with the other one, the communication information selecting unit 17 stores the communication information being input from the communication monitoring unit 8 in the communication information storage 9. In the meanwhile, when none of the application to be analyzed and API type coincides with the other, the communication information selecting unit 17 discards (deletes) the communication information being input from the communication monitoring unit 8. That is to say, the communication information selecting unit 17 selects the communication information generated in the communication monitoring unit 8 based on at least one of the API type, the destination application type, and the source application type, which are preset.

When the processor 15 in FIG. 3 executes a program stored in the memory 16, for example, the communication information selecting unit 17 is achieved as a function of the processor 15. However, the communication information selecting unit 17 may also be achieved by the plurality of processors 15 in cooperation with each other, for example.

The user can set, using the input device 18, whether to select the communication information based on one of the application to be analyzed and the API type or whether to select the communication information based on both the application to be analyzed and the API type. The communication monitoring unit 8 may retain the API type, the destination application type, and the source application type being input from the input device 18.

As described above, according to the embodiment 2, the performance evaluation can be performed without processing the large amount of communication information, thus the calculation load in the communication information analyzing unit 10 is reduced. Moreover, even when the region to store the communication information cannot be sufficiently secured, the performance evaluation can be performed.

Embodiment 3

The embodiment 1 describes the case of performing the performance evaluation of the information processing distribution system every integration time $t_{int}$ (at short time intervals). In the meanwhile, the performance of the information processing distribution system may change over a longer period of time. A trend of a temporal performance change over the long period of time (referred to as the performance change trend hereinafter) occurs by a fluctuation in the calculation load of the application or a change in a congestion degree of a communication traffic in a device which mediates the communication between each of the application executing units (the inter-application communication unit 14 in the example in FIG. 1). Accordingly, when the performance change trend over the long period of time is confirmed, the information such as a recognition of a problem occurring in managing the information processing distribution system or in the information processing distribution system, which cannot be recognized by the performance evaluation at short time intervals, can be obtained. The embodiment 3 of the present invention is to achieve such a function, and is described in detail hereinafter.

Figure 9:
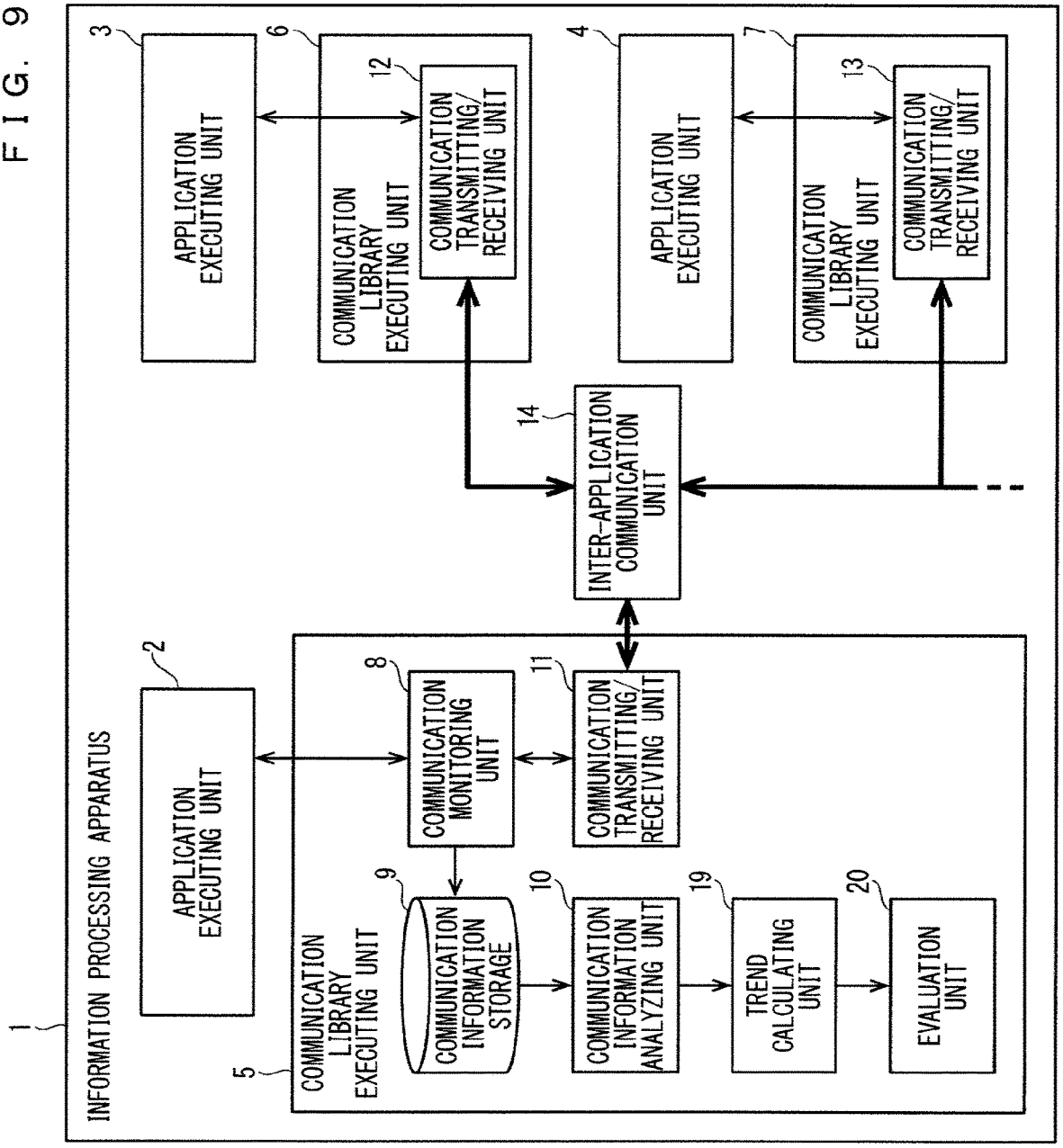
FIG. 9 A block diagram illustrating an example of a configuration of an information processing apparatus according to an embodiment 3 of the present invention.

FIG. 9 is a block diagram illustrating an example of a configuration of the information processing apparatus 1 according to the embodiment 3. The embodiment 3 describes a case of achieving the information processing distribution system in the single information processing apparatus 1.

As illustrated in FIG. 9, the information processing apparatus 1 according to the embodiment 3 has a feature of including a trend calculating unit 19 and an evaluation unit 20. The other configuration and operation are similar to that of the embodiment 1, so that the detailed description is omitted here.

The communication information analyzing unit 10 inputs the distribution of the time difference calculated for each application and each API type to the trend calculating unit 19. That is to say, the communication information analyzing unit 10 calculates, for each application and API type, the time distribution indicating the distribution of the time required for the data communication between one application executing unit and the other application executing unit.

Firstly, the trend calculating unit 19 retains therein the distribution of the time difference being momentarily input from the communication information analyzing unit 10. Next, the trend calculating unit 19 calculates the performance change trend based on the retained distribution of the time difference, and inputs the calculated performance change trend to the evaluation unit 20.

Figure 10:
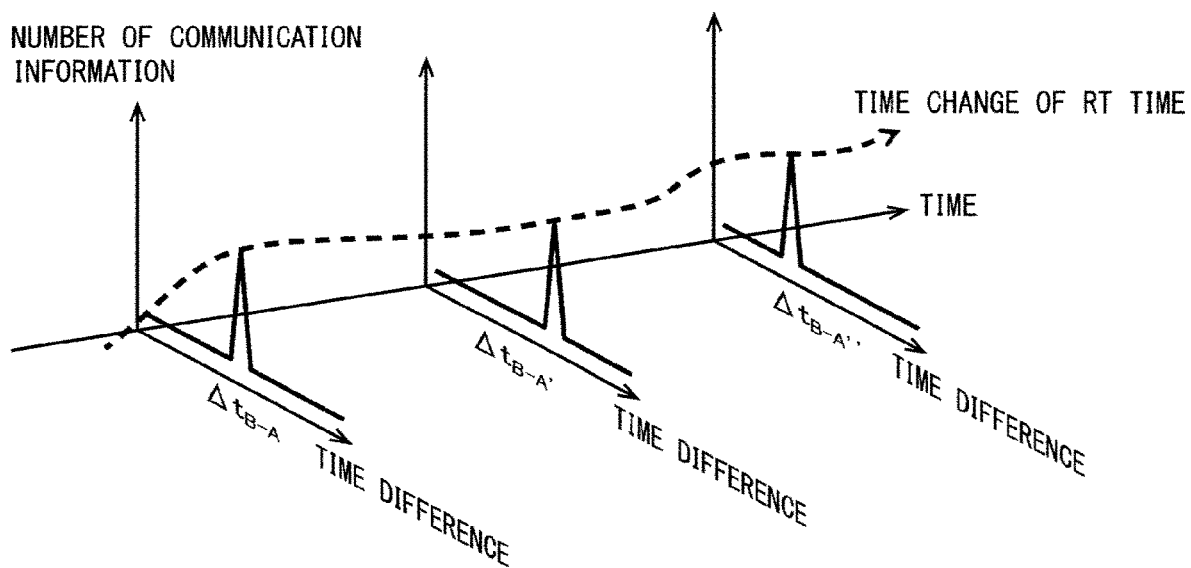
FIG. 10 A diagram for explaining a calculation of a performance change trend according to the embodiment 3 of the present invention.

FIG. 10 is a diagram for explaining the calculation of the performance change trend.

As illustrated in FIG. 10, the trend calculating unit 19 calculates the RT time based on the peak position of the distribution of each time difference to calculate the (temporal change) of the RT time as the performance change trend (a curved line illustrated by a dashed arrow in FIG. 10) The trend calculating unit 19 may also calculate the performance change trend, using the other method, such as calculating the time change based on the peak width of the distribution of each time difference to determine the time change to be the performance change trend regarding the fluctuation of the RT time (that is to say, a variation in the performance of the information processing distribution system).

Going back to FIG. 9, the evaluation unit 20 firstly classifies and retains the performance change trend being input from the trend calculating unit 19 for each pair of API types and application. Next, the evaluation unit 20 compares the retained performance change trend to perform a desired evaluation.

Figure 11:
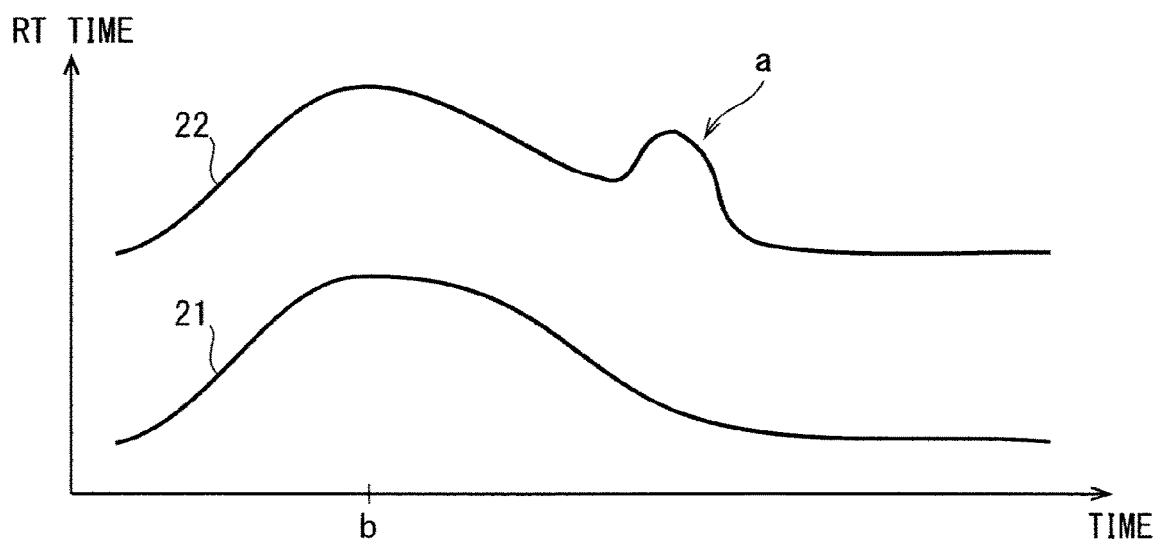
FIG. 11 A diagram for explaining an evaluation of the performance change trend according to the embodiment 3 of the present invention.

FIG. 11 is a diagram for explaining the evaluation of the performance change trend.

In FIG. 11, a performance change trend 21 is a curved line indicating a trend of the RT time between the application executing unit (the application executing unit 2 herein) for executing an application (the application A herein) and the application executing unit (the application executing unit 3 herein) for executing the other application (the application B herein). A performance change trend 22 is a curved line indicating a trend of the RT time between the application executing unit 2 for executing the application A and the application executing unit (the application executing unit 4 herein) for executing the other application (the application C herein). In FIG. 11, for easy comparison of the performance change trend 21 with the performance change trend 22, a certain time offset is added to the performance change trend 22 so that the performance change trend 22 does not overlap the performance change trend 21.

As illustrated in FIG. 11, the performance change trend 21 and the performance change trend 22 indicate substantially the same behavior (trend). This means that the communication load from the application executing unit 2 to the application executing unit 3 and the processing load in the application executing unit 3 are substantially similar to the communication load from the application executing unit 2 to the application executing unit 4 and the processing load in the application executing unit 4.

In the meanwhile, a raised part, which is not seen in the performance change trend 21, appears in the performance change trend 22 in a temporally-limited portion indicated by "a" in FIG. 11. Herein, as illustrated in FIG. 9, in the information processing apparatus 1 according to the embodiment 3, a path between the application executing unit 2 and the application executing unit 3 and a path between the application executing unit 2 and the application executing unit 4 communicate with each other via the common inter-application communication unit 14, thus the communication load from the application executing unit 2 to the application executing unit 3 and the communication load from the application executing unit 2 to the application executing unit 3 can be considered to be the same. Accordingly, it can be understood that the raised part in the performance change trend 22 in the portion indicated by "a" in FIG. 11 indicates a partial increase in the processing load in the application executing unit 3.

The performance change trend may also be evaluated by a method described below besides the above method. At a time b in FIG. 11, the RT time increases in both the performance change trend 21 and the performance change trend 22. In a period of time around the time b, the function which is a factor increasing the processing load of the whole information processing distribution system can be specified by causing the performance change trend 21 and the performance change trend 22 to correspond with the pair of API types estimated in the communication information analyzing unit 10.

The evaluation unit 20 can perform the evaluation by not only the methods described above but also a preferred method for analyzing the performance of the whole information processing distribution system required by an evaluator based on the comparison of the plurality of performance change trends.

In FIG. 9, when the processor 15 in FIG. 3 executes a program stored in the memory 16, for example, the trend calculating unit 19 and the evaluation unit 20 are achieved as the function of the processor 15. However, these may be achieved by a plurality of processors 15 in cooperation with each other, for example.

As described above, according to the embodiment 3, the performance change trend over the long period of time can be obtained with regard to the performance of the information processing distribution system. Accordingly, a state or an occurrence of a problem in the information processing distribution system, which cannot be recognized by the performance evaluation at short time intervals, can be grasped.

Embodiment 4

The embodiment 1 describes a case where the information processing apparatus 1, which is subject to the performance evaluation, includes the communication information analyzing unit 10. When the information processing apparatus 1 according to the embodiment 1 is a computer terminal including a display for outputting the information, for example, the performance evaluation analyzed by the communication information analyzing unit 10 can be easily confirmed. However, when the information processing apparatus 1 according to the embodiment 1 is applied to the information processing distribution system having a limited input-output means, such as the embedded device, it is difficult to confirm the performance evaluation analyzed by the communication information analyzing unit. Moreover, when the information processing distribution system is the embedded device, the information processing resource is limited, so that it is not preferable to simultaneously execute the other function (a processing of displaying the performance evaluation, for example) other than a function provided by the embedded device in some cases.

In order to solve such a problem, the embodiment 4 of the present invention has a feature of providing the communication information analyzing unit in the other information processing apparatus, which is different from the information processing apparatus on which the performance evaluation is performed, thereby performing the analytical processing and displaying the performance evaluation using the other information processing apparatus. An information processing distribution system according to the embodiment 4 is described in detail hereinafter.

Figure 12:
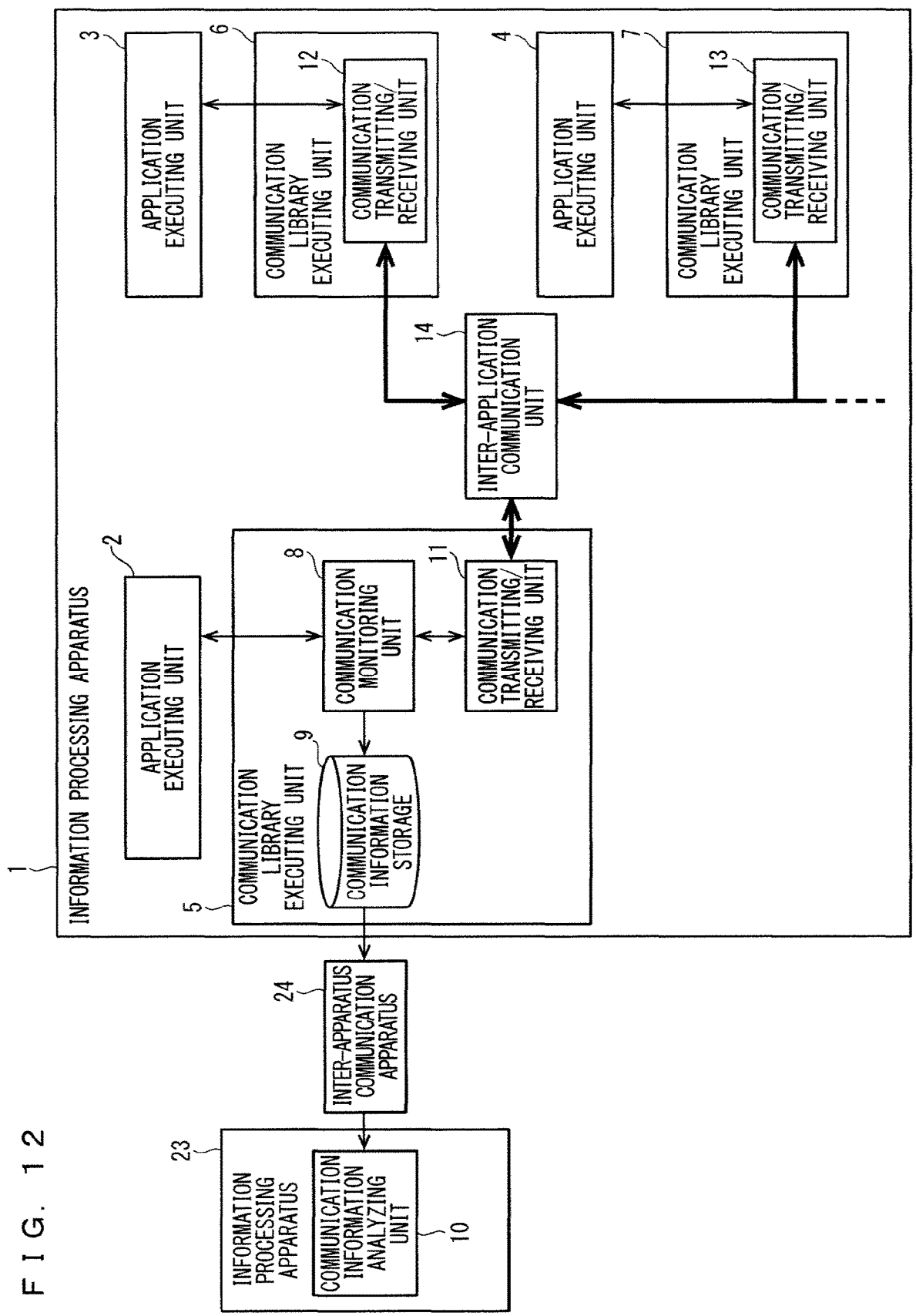
FIG. 12 A block diagram illustrating an example of a configuration of an information processing apparatus according to an embodiment 4 of the present invention.

FIG. 12 is a block diagram illustrating an example of a configuration of information processing apparatuses 1 and 23 according to the embodiment 4. The embodiment 4 describes a case of achieving the information processing distribution system in the single information processing apparatus 1, and achieving the function of performing the performance evaluation in the information processing apparatuses 1 and 23.

As illustrated in FIG. 12, the information processing apparatus 23 which is different from the information processing apparatus 1 is provided in the embodiment 4. The information processing apparatus 23 includes the communication information analyzing unit 10. The information processing apparatus 1 and the information processing apparatus 23 are communicatively connected to each other via an inter-apparatus communication apparatus 24. The other configuration and operation are similar to that of the embodiment 1, so that the detailed description is omitted here.

The communication information storage 9 has an interface or a function for being communicatively connected to the inter-apparatus communication apparatus 24 and a function of transmitting the stored communication information to the communication information analyzing unit 10 via the inter-apparatus communication apparatus 24. The communication information storage 9 may be achieved by using a region secured in a memory mounted on the information processing apparatus 1, for example. When the information processing apparatus 1 includes a Universal Serial Bus (USB) port or a SD card port, for example, the communication information storage 9 may also be achieved by using a storing region of a USB memory device or an SD card (trademark) connected to these ports. As described above, when the communication information storage 9 can be attached to and detached from the information processing apparatus 1 and can be further attached to and detached from the other information processing apparatus (the information processing apparatus 23 in the example in FIG. 12), the communication information storage 9 does not need to have a function of being connected to the inter-apparatus communication apparatus 24.

The communication information analyzing unit 10 has an interface or a function for being communicatively connected to the inter-apparatus communication apparatus 24 and a function of receiving the communication information transmitted from the communication information storage 9 via the inter-apparatus communication apparatus 24. When the communication information storage 9 is achieved by a USB memory device or an SD card, the communication information analyzing unit 10 may have a function of reading out the information stored in the USB memory device or the SD card instead of having the interface for being connected to the inter-apparatus communication apparatus 24.

The inter-apparatus communication apparatus 24 mediates the communication between the information processing apparatus 1 and the information processing apparatus 23. The inter-apparatus communication apparatus 24 may be a serial communication device, a Local Area Network (LAN) device, or a device for executing a communication via Internet, for example.

When the processor 15 in FIG. 3 executes a program stored in the memory 16, for example, the communication information analyzing unit 10 in the information processing apparatus 23 is achieved as a function of the processor 15. However, these may be achieved by a plurality of processors 15 in cooperation with each other, for example.

Next, operations of the information processing apparatuses 1 and 23 are described.

In the embodiment 1, the communication information analyzing unit 10 obtains the communication information from the communication information storage 9 at an optional timing and analyses it. In the meanwhile, in the embodiment 4, the communication information storage 9 continues to accumulate the communication information generated in the communication monitoring unit 8 while the information processing apparatus 1 executes the function as the information processing distribution system. At this time, the communication information analyzing unit 10 does not obtain the communication information from the communication information storage 9. Then, when the information processing apparatus 1 stops the function as the information processing distribution system, the processing relating to the performance evaluation is executed in the information processing apparatus 23. When the above processing is executed, the communication information analyzing unit 10 requires the communication information of the communication information storage 9 via the inter-apparatus communication apparatus 24, thereby obtaining the communication information from the communication information storage 9. The analysis in the communication information analyzing unit 10 is similar to the analysis performed in the embodiment 1.

As described above, according to the embodiment 4, the processing relating to the performance evaluation can be executed by the other information processing apparatus, which is different from the information processing apparatus on which the performance evaluation is performed. Accordingly, even when the information processing distribution system is made up of the embedded device which does not include the sufficient input-output means, the result of the performance evaluation can be easily used. The information processing distribution system can operate without the processing load applied for executing the processing relating to the performance evaluation.

Embodiment 5

The embodiments 1 to 4 describe the case of achieving the information processing distribution system in the single information processing apparatus. However, in general, the plurality of information processing apparatuses are communicatively connected to each other to achieve the information processing distribution system in some cases.

Examples of the means of communicatively connecting the plurality of information processing apparatuses include a serial bus such as a USB or IEEE1394, an Near Field Communication (NFC), a wired connection LAN, a wireless connection LAN, and Internet, for example. However, when the information processing apparatus performs a connection using the USB, for example, the user has a possibility of inserting or removing a connector at an optional timing. In a method of performing a connection using the wireless communication or Internet, a quality of the communication may change in accordance with a state of a surrounding magnetic field environment or network. Accordingly, the information processing distribution system achieved by the plurality of information processing apparatuses generally has a possibility that a communication speed decreases or a disconnection and recovery of a communication connection occur during the operation, for example.

It is necessary to detect a change in the communication state or a change in a total number of information processing apparatuses capable of achieving the function as the information processing distribution system, and select the appropriate communication means and the information processing apparatus in order to continuously and stably execute the function as the information processing distribution system in such a state. Accordingly, the performance evaluation needs to be performed also in the information processing distribution system achieved by the plurality of information processing apparatuses.

In order to perform the performance evaluation in the information processing distribution system achieved by the plurality of information processing apparatuses, the embodiment 5 of the present invention has a feature of monitoring the communication between each information processing apparatus and estimating the pair of API types having the causal relationship for each communication means performing the communication with each information processing apparatus. The information processing distribution system according to the embodiment 5 is described in detail hereinafter.

Figure 13:
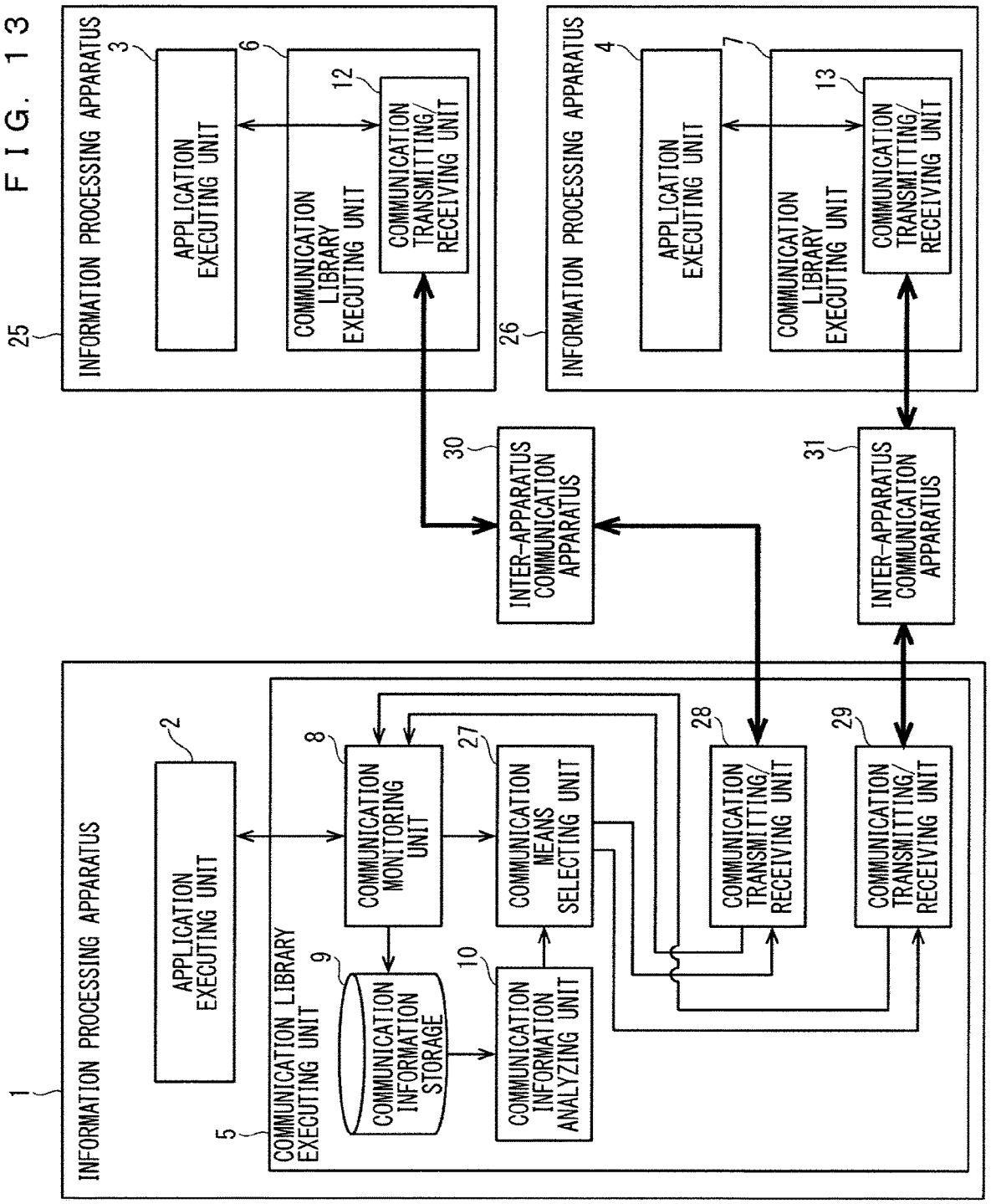
FIG. 13 A block diagram illustrating an example of a configuration of an information processing apparatus according to an embodiment 5 of the present invention.

FIG. 13 is a block diagram illustrating an example of a configuration of information processing apparatuses 1, 25, and 26 according to the embodiment 5. The embodiment 5 describes a case of achieving the information processing distribution system in the plurality of information processing apparatuses 1, 25, and 26.

As illustrated in FIG. 13, the information processing apparatus 1 has a feature of including a communication means selecting unit 27 and communication transmitting/receiving units 28 and 29. The information processing apparatus 25 includes the application executing unit 3 and the communication library executing unit 6. The information processing apparatus 26 includes the application executing unit 4 and the communication library executing unit 7. The communication transmitting/receiving unit in the communication library executing unit 5 and the communication transmitting/receiving unit 12 in the communication library executing unit 6 are communicatively connected to each other via an inter-apparatus communication apparatus 30. The communication transmitting/receiving unit 29 in the communication library executing unit 5 and the communication transmitting/receiving unit 13 in the communication library executing unit 7 are communicatively connected to each other via an inter-apparatus communication apparatus 31. The other configuration and operation are similar to that of the embodiment 1, so that the detailed description is omitted here.

The information processing apparatus 25 may be made up of the same hardware and operating system as the information processing apparatus 1, or may also be made up of a hardware and operating system different from the information processing apparatus 1. The communication transmitting/receiving unit 12 has a function of enabling the application executing unit 3 to use the function of the inter-apparatus communication apparatus 30.

The information processing apparatus 26 may be made up of the same hardware and operating system as the information processing apparatus 1, or may also be made up of a hardware and operating system different from the information processing apparatus 1. The communication transmitting/receiving unit 13 has a function of enabling the application executing unit 4 to use the function of the inter-apparatus communication apparatus 31.

The inter-apparatus communication apparatuses 30 and 31 achieve the communication between the information processing apparatuses 1, 25, and 26 by the same communication means or the different communication means. The communication means may be a serial communication device, a LAN device, or a device for executing a communication via Internet, for example. The communication means may be a communication device specializing in an in-vehicle LAN such as Controller Area Network (CAN) or Media Oriented System Transport (MOST) or embedding usage.

The communication means selecting unit 27 has a function that when the analysis result obtained by the communication information analyzing unit 10, that is to say, the pair of API types having the causal relationship and the RT time based on the pair of API types are input, the communication means selecting unit 27 selects, based on these pieces of information, the information processing apparatus performing the data communication using a certain API (the information processing apparatuses 25 or 26 in the example in FIG. 13) and the communication transmitting/receiving unit (the communication transmitting/receiving unit 28 or 29 in the example in FIG. 13), and sorts the data relating to the data communication being input from the communication monitoring unit 8 into the communication transmitting/receiving unit 28 or 29.

In FIG. 13, when the processor 15 in FIG. 3 executes a program stored in the memory 16, for example, the communication means selecting unit 27 and the communication transmitting/receiving units 28 and 29 in the information processing apparatus 1 are achieved as functions of the processor 15. However, these may be achieved by a plurality of processors 15 in cooperation with each other, for example.

When the processor 15 in FIG. 3 executes a program stored in the memory 16, for example, the application executing unit 3, the communication library executing unit 6, and the communication transmitting/receiving unit 12 in the information processing apparatus 25 are achieved as functions of the processor 15. However, these may be achieved by a plurality of processors 15 in cooperation with each other, for example.

When the processor 15 in FIG. 3 executes a program stored in the memory 16, for example, the application executing unit 4, the communication library executing unit 7, and the communication transmitting/receiving unit 13 in the information processing apparatus 26 are achieved as functions of the processor 15. However, these may be achieved by a plurality of processors 15 in cooperation with each other, for example.

Next, an operation of the information processing apparatus 1 is described.

The data communication inputting and outputting the application executing unit 2 is monitored by the communication monitoring unit 8. The communication monitoring unit 8 generates the communication information for the data relating to the data communication.

FIG. 14 is a diagram illustrating an example of the communication information generated in the communication monitoring unit 8.

As illustrated in FIG. 14, the communication monitoring unit 8 according to the embodiment 5 generates the communication information further including the communication means type which indicates a type of the communication means (the communication transmitting/receiving units 28 or 29) in comparison with the communication information generated by the communication monitoring unit 8 according to the embodiment 1 (refer to FIG. 2). A name or an ID number ("#1" in an example in FIG. 14) uniquely indicating the communication means is generated as the communication means type.

The communication information storage 9 stores the communication information generated in the communication monitoring unit 8. The communication information storage 9 according to the embodiment 5 differs from the communication information storage 9 according to the embodiment 1 in storage capacity or prototype declaration of the API performing a storage processing.

The communication information analyzing unit 10 performs an analytical processing for each communication means type in addition to the analytical processing described in the embodiment 1 (refer to FIG. 4).

Figure 15:
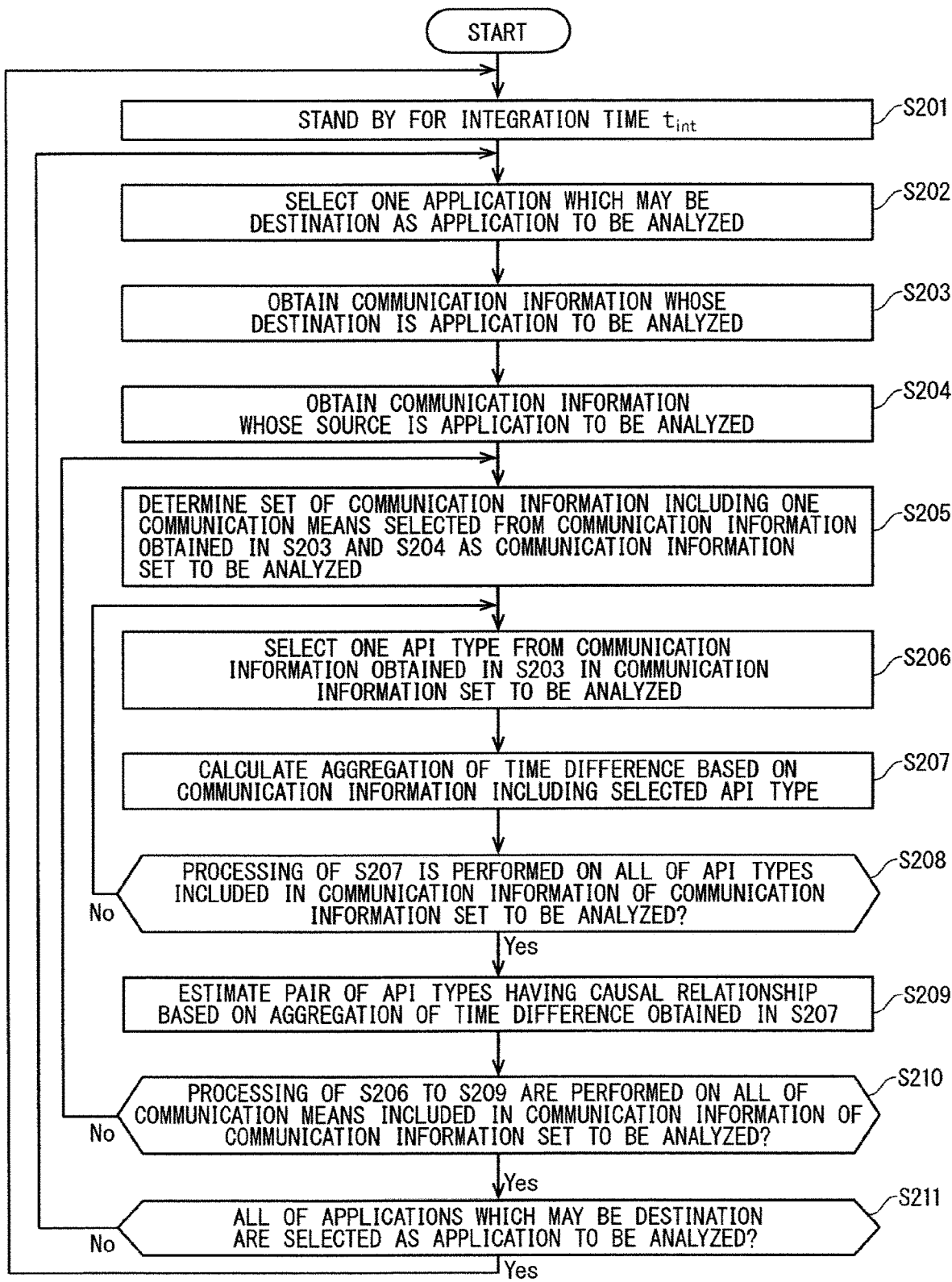
FIG. 15 A flow chart showing an example of an operation of a communication information analyzing unit according to the embodiment 5 of the present invention.

FIG. 15 is a flow chart showing an example of an operation of the communication information analyzing unit 10.

Since a processing similar to that of Steps S101 to S104 in FIG. 4 is performed in Steps S201 to S204, the description is omitted here.

In Step S205, a set of communication information including one communication means selected from the communication information obtained in Step S203 and Step S204 is defined as a communication information set to be analyzed.

In Step S206 to Step S209, a processing similar to that of Step S105 to S108 in FIG. 4 is performed on the communication information set to be analyzed, and the pair of API types having the causal relationship and the RT time, in a case of using the selected communication means, are respectively estimated. In step S209, the information of the RT time estimated for each application, communication means, and API type is input to the communication means selecting unit 27.

Performed in Step S210 is a determination whether or not the processing of Step S206 to Step S209 is performed on all of the communication means included in the communication information of the communication information set to be analyzed. When the processing of Step S206 to Step S209 is performed on all of the communication means included in the communication information of the communication information set to be analyzed, the processing proceeds to Step S211. In the meanwhile, when the processing of Step S206 to Step S209 is not performed on all of the communication means included in the communication information of the communication information set to be analyzed, the processing proceeds to Step S205.

Since a processing similar to that of Step S109 in FIG. 4 is performed in Step S211, the description is omitted here.

The communication means selecting unit 27 selects the communication transmitting/receiving unit 28 or 29 preferentially used for a certain API type of a certain application based on the RT time estimated for each application, communication means, and APT type being input from the communication information analyzing unit 10. Then, the data relating to the data communication being input from the communication monitoring unit 8 is input to the selected communication transmitting/receiving unit 28 or 29.

As the method of selecting the communication transmitting/receiving unit 28 or 29 using the RT time, a preferred method may be adopted to achieve the necessary behavior in the communication means selecting unit 27, the preferred method including a method of selecting the communication transmitting/receiving unit 28 or 29 having the shortest RT time or a method of selecting the communication transmitting/receiving unit 28 or 29 having the smallest diffusion of RT time, that is to say, the communication transmitting/receiving unit 28 or 29 indicating a stable performance.

As described above, according to the embodiment 5, the RT time can be estimated for each communication means. Accordingly, in the information processing distribution system in which the plurality of communication means are simultaneously used, the performance evaluation can be performed just by changing the communication library executing unit without rewriting the application. Moreover, the communication means having a favorable communication state can be preferentially used, thus an enhancement and optimization of the performance of the whole information processing distribution system can be achieved.

In FIGS. 1, 8, 9, 12, and 13, the application executing units 2, 3, and 4, the communication library executing units 5, 6, and 7, the communication monitoring unit 8, the communication information analyzing unit 10, the communication transmitting/receiving units 11, 12, and 13, the inter-application communication unit 14, the communication information selecting unit 17, the trend calculating unit 19, the evaluation unit 20, the communication means selecting unit 27, and the communication transmitting/receiving units 28 and 29 are respectively achieved when the processor 15 in FIG. 3 operates in accordance with the software program stored in the memory 16. However, in place of this, the application executing units 2, 3, and 4, the communication library executing units 5, 6, and 7, the communication monitoring unit 8, the communication information analyzing unit 10, the communication transmitting/receiving units 11, 12, and 13, the inter-application communication unit 14, the communication information selecting unit 17, the trend calculating unit 19, the evaluation unit 20, the communication means selecting unit 27, and the communication transmitting/receiving units 28 and 29 may be respectively constituted as a hardware (for example, an operational/processing circuit constituted to perform a specific operation or processing on an electrical signal). Alternatively, the both described above may also be mixed.

A term of "processing circuit" can also be used in place of the term of "unit" as a concept of combining each of the application executing units 2, 3, and 4, the communication library executing units 5, 6, and 7, the communication monitoring unit 8, the communication information analyzing unit 10, the communication transmitting/receiving units 11, 12, and 13, the inter-application communication unit 14, the communication information selecting unit 17, the trend calculating unit 19, the evaluation unit 20, the communication means selecting unit 27, and the communication transmitting/receiving units 28 and 29 of the software and the application executing units 2, 3, and 4, the communication library executing units 5, 6, and 7, the communication monitoring unit 8, the communication information analyzing unit 10, the communication transmitting/receiving units 11, 12, and 13, the inter-application communication unit 14, the communication information selecting unit 17, the trend calculating unit 19, the evaluation unit 20, the communication means selecting unit 27, and the communication transmitting/receiving units 28 and 29 of the hardware.

According to the present invention, the above embodiments can be arbitrarily combined, or each embodiment can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1 Information processing apparatus, 2, 3, 4 Application executing unit, 5, 6, 7 Communication library executing unit, 8 Communication monitoring unit, 9 Communication information storage, 10 Communication information analyzing unit, 11, 12, 13 Communication transmitting/receiving unit, 14 Inter-application communication unit, 15 Processor, 16 Memory, 17 Communication information selecting unit, 18 Input device, 19 Trend calculating unit, 20 Evaluation unit, 21, 22 Performance change trend, 23 Information processing apparatus, 24 Inter-apparatus communication apparatus, 25, 26 Information processing apparatus, 27 Communication means selecting unit, 28, 29 Communication transmitting/receiving unit, 30, 31 Inter-apparatus communication apparatus

The invention claimed is:

1. An information processing apparatus, comprising:
a plurality of application executing units each executing an application for achieving a preset function; and
a plurality of communication library executing units provided to correspond to each of said application executing units to manage a data communication between each of said application executing units, wherein
said communication library executing unit comprises:
a communication monitoring unit monitoring said data communication of one of said application executing units provided to correspond to said communication library executing unit itself and other of said application executing units, and generating a communication information including application programming interface ("API") types each indicating a type of an API used in said one of application executing units at time of said data communication for all of said data communication which is monitored;
a communication information storage storing said communication information generated in said communication monitoring unit; and
a communication information analyzing unit estimating a pair of said API types used in said one of application executing units at time of said data communication based on said communication information stored in said communication information storage.

2. The information processing apparatus according to claim 1, wherein
said communication information further includes a destination application type indicating a type of said application executed by said application executing unit of which is to be a destination of said data communication, a source application type indicating a type of said application executed by said application executing unit which is to be a source of said data communication, and an input time indicating a time when data relating to said data communication has been input to said communication monitoring unit.

3. The information processing apparatus according to claim 2, wherein
said communication information analyzing unit calculates a round-trip time between said application executing units based on said input time included in said communication information including one of said estimated pair of API types.

4. The information processing apparatus according to claim 2, further comprising
a communication information selecting unit selecting said communication information generated in said communication monitoring unit based on at least one of said API type, said destination application type, and said source application type, which are preset.

5. The information processing apparatus according to claim 1, wherein
said communication information analyzing unit calculates, for each of said application and said API type, a time distribution indicating a distribution of a time required for said data communication between one of said application executing units and said other of said application executing units, and
said communication library executing unit further includes
a trend calculating unit calculating a trend of a temporal change of said time based on said time distribution analyzed in said communication information analyzing unit
and an evaluation unit performing an evaluation of said information processing apparatus based on said trend calculated in said trend calculating unit.

6. The information processing apparatus according to claim 1, wherein
said communication information storage is attachable and detachable.

7. The information processing apparatus according to claim 1, wherein
said plurality of application executing units in each of said application executing units and said plurality of communication library executing units in each of said communication library executing units are provided in at least one other information processing apparatus different from said information processing apparatus,
said communication library executing unit further comprises:
a plurality of communication transmitting/receiving units transmitting and receiving data relating to said data communication between each of said application executing units, respectively; and
a communication means selecting unit selecting one of said communication transmitting/receiving units performing said data communication,
said communication monitoring unit generates said communication information including a communication means type indicating a type of said communication transmitting/receiving units used for said data communication,
said communication information analyzing unit estimates said pair of said API types for each of said communication means type, and
said communication means selecting unit selects one of said communication transmitting/receiving units based on said pair of said API types estimated in said communication information analyzing unit.

8. An information processing system, comprising:
a plurality of application executing units each executing an application for achieving a preset function; and
a plurality of communication library executing units provided to correspond to each of said application executing units to manage a data communication between each of said application executing units, wherein
said communication library executing unit comprises:
an information processing apparatus including:
a communication monitoring unit monitoring said data communication of one of said application executing units provided to correspond to said communication library executing unit itself and other of said application executing units, and generating a communication information including application programming interface ("API") types each indicating a type of an API used in said one of application executing units at time of said data communication for all of said data communication which is monitored; and
a communication information storage storing said communication information generated in said communication monitoring unit; and other information processing apparatus estimating a pair of said API types used in said one of application executing units at time of said data communication based on said communication information stored in said communication information storage, said other information processing apparatus being communicatively connected to said information processing apparatus.

9. The information processing system according to claim 8, wherein
said communication information storage is attachable and detachable.

10. An information processing apparatus, comprising:
a plurality of application executing circuits each executing an application for achieving a preset function; and
a plurality of communication library executing circuits provided to correspond to each of said application executing circuits to manage a data communication between each of said application executing circuits, wherein
each of said communication library executing circuits comprises:
processing circuitry configured to
  monitor said data communication of one of the application executing circuits provided to correspond to said communication library executing circuit itself and other of said application executing circuits,
  generate communication information including application programming interface ("API") types, each indicating a type of an API used in the one of the application executing circuits at time of said data communication for all of said data communication which is monitored,
  instruct storing of the generated communication information, and
  estimate a pair of said API types used in said one of application executing circuits at time of said data communication based on said stored communication information.

11. The information processing apparatus according to claim 10, wherein
said communication information further includes a destination application type indicating a type of said application executed by an application executing circuit of which is to be a destination of said data communication, a source application type indicating a type of said application executed by said application executing circuit which is to be a source of said data communication, and an input time indicating a time when data relating to said data communication has been input to said processing circuitry.

12. The information processing apparatus according to claim 11, wherein
the processing circuitry is further configured to calculate a round-trip time between said application executing circuits based on said input time included in said communication information including one of said estimated pair of API types.

13. The information processing apparatus according to claim 11, wherein the processing circuitry is further configured to select said generated communication information based on at least one of said API type, said destination application type, and said source application type, which are preset.

14. The information processing apparatus according to claim 10, wherein
said processing circuitry is further configured to
calculate, for each of said application and said API type, a time distribution indicating a distribution of a time required for said data communication between one of said application executing circuits and said other of said application executing circuits,
calculate a trend of a temporal change of said time based on said time distribution, and
perform an evaluation of said information processing apparatus based on said calculated trend.

15. The information processing apparatus according to claim 10, wherein said generated communication information is stored in a communication information storage, which is attachable and detachable.

16. The information processing apparatus according to claim 10, wherein
the processing circuitry is further configured to
control transmitting and receiving data relating to said data communication between each of said application executing circuits and at least one external application executing circuit, respectively using communication transmitting/receiving circuits, and
select one of said communication transmitting/receiving circuits performing said data communication by being configured to
  generate said communication information including a communication type indicating a type of said communication transmitting/receiving circuits used for said data communication,
  estimate said pair of said API types for each of said communication type, and
  select one of said communication transmitting/receiving circuits based on said estimated pair of said API types.

* * * * *